HIGH-SPEED FILM READER/RECORDER WITH GRID REFERENCE

Filed March 5, 1965 3 Sheets-Sheet 1

INVENTOR:

EDWARD FREDKIN

BY,

Dike, Thompson, Bronstein & Mrose

ATTORNEYS

HIGH-SPEED FILM READER/RECORDER WITH GRID REFERENCE
Filed March 5, 1965 3 Sheets-Sheet 2
FIG. 2a
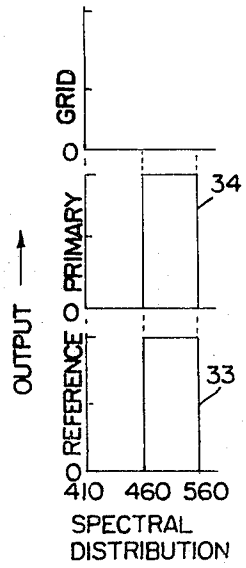
FIG. 2b
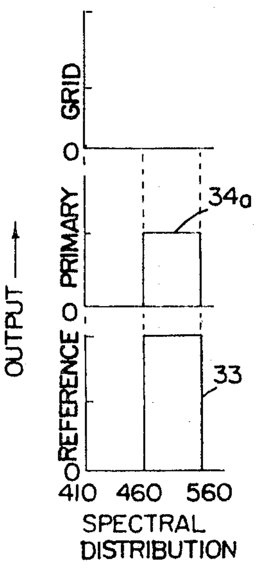
FIG. 2c
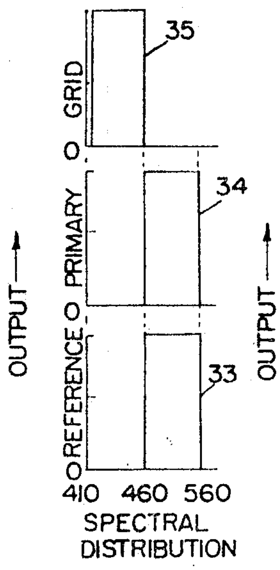
FIG. 2d
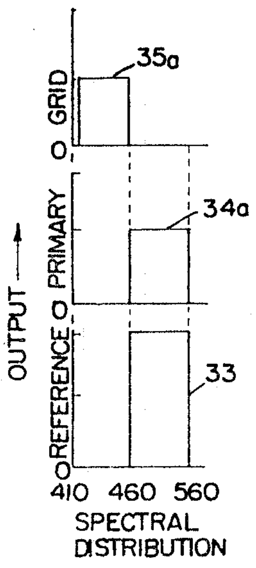
FIG. 3a
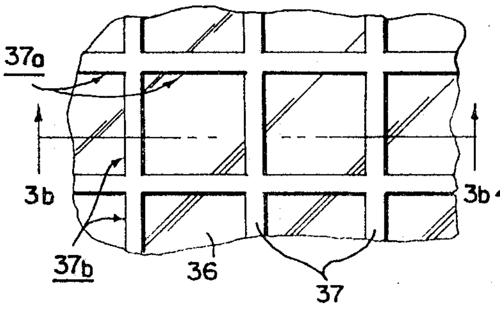
FIG. 4a
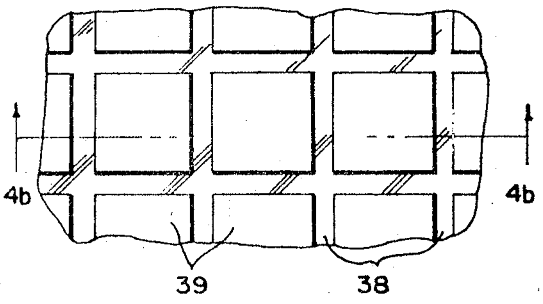
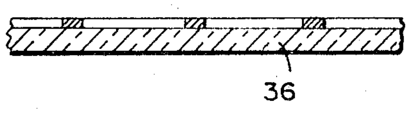
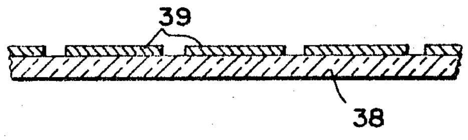
FIG. 3b FIG. 4b
*INVENTOR:*
EDWARD FREDKIN
*BY,*
Dike, Thompson, Bronstein & Mrose
*ATTORNEYS*

HIGH-SPEED FILM READER/RECORDER WITH GRID REFERENCE

Filed March 5, 1965 3 Sheets-Sheet 3

INVENTOR:

EDWARD FREDKIN

BY,

Dike, Thompson, Bronstein & Mrose

ATTORNEYS

United States Patent Office 3,460,099

Patented Aug. 5, 1969

3,460,099

HIGH-SPEED FILM READER/RECORDER WITH GRID REFERENCE

Edward Fredkin, Natick, Mass., assignor to Information International, Inc., Cambridge, Mass., a corporation of Massachusetts Filed Mar. 5, 1965, Ser. No. 437,460
Int. Cl. G11b 9/00, 9/04; H01j 29/96
U.S. Cl. 340—173 17 Claims

ABSTRACT OF THE DISCLOSURE

Film records and the like, and an associated grid reference having optically distinctive grid lines, are synchronously scanned by light output of a cathode ray tube as programmed by cooperating digital computer equipment; light-responsive outputs characterizing optical conditions of the records are coordinated with those of the grid reference to identify each locus of recorded intelligence precisely under optimum conditions of sharp small-area scanning, despite indexing uncertainties in associated transport mechanisms.

The present invention relates to improvements in high-speed automatic reading of and recording on film and the like, and, in one particular aspect, to novel and improved electro-optical apparatus operated with computers wherein unique grid provisions extend the precision of reading from or recording on film.

There are numerous areas, in industry, medicine, and government, for example, where vast qauntities of data and information in graphical and pictorial form are amassed very quickly but, in turn, can be processed only relatively slowly and laboriously. In many instances, qualitative analyses of these visual records tend to be unsatisfactory because of such factors as record imperfections, high levels of interference, and observer errors. By way of illustration, although it is found that photographic techniques can be exploited to special advantages in obtaining rather fast and economical records of rapidly-changing displays on cathode ray tube indicators, these motion-picture film records may typically accumulate in enormous lengths in short periods of time, and certain variations in film densities and in the sharpness of developed images may affect the precision with which information can later be extracted from the film. Visual inspection and point-by-point measurement of each of the images on the multitudinous frames of such long photographic records is exceedingly tiresome and costly, and, being dependent upon human eye sensitivities and acuities of perception, the measurements of variable information recorded against variable backgrounds tend to be subjective and seriously unreliable. Some increase in processing speed has been realized through use of semi-automatic plotting devices which detect and register the coordinates of successive image points across which an opeartor has positioned a pair of crosshairs or the like; however, this technique nevertheless remains relatively tedious and, moreover, is imprecise because of its dependence upon unreliable perceptions by human operators. Electronic scanning of the general type employed in television systems suggests itself as an approach which would significantly accelerate the reading processes, although, somewhat surprisingly, even this leaves much to be desired because of relatively extravagent waste of time in scanning raster areas which are devoid of information, and because electronic scanning tends to produce imprecise results due to variations in beam spot sizes and lack of exact coordination with film transport mechanisms.

The aforesaid disadvantage having to do with time losses in electronic scanning systems are uniquely circumvented, and extraordinary speed is developed, in reading systems wherein the visual records which are to be examined are scanned optically by the light output of a cathode ray tube which generates only such successive points of scanning light as are essential to close investigation of recorded information, the scanning being programmed within associated digital computer equipment. Wasteful losses of time which would otherwise occur and be accumulated during more extensive scanning excursions, short as these may at first seem to be in the case of a cathode ray tube device, are avoided by relying upon the very much faster logic and control of digital computer circuitry to program the scan only within the narrow limits where it is actually found to be necessary. Further, the optical scanning may be rendered substantially immune to common distrubances caused by density variations in the film or other record medium by operation of special optical comparator provisions in the system. However, the mechanical aspects of precisely orienting a record, such as film, and the electro-optical aspects of maintaining a uniform and sharp scanning spot over a wide range of deflections, have constituted severe handicaps to the preservation of system accuracies. Specifically, the exact correlations of data read from records are found to demand extraordinary precision in the transport mechanisms used to adjust the physical positions of the records relative to the electro-optical read-out elements (i.e., cathode ray tube, lenses, etc.). Further, although the scanning spots developed by a cathode ray tube are readily kept sharp within a relatively small area near the optical axis of the tube, quality tends to be seriously degraded elsewhere, and this introduces operational accuracies where the scanned records are large. In accordance with the present teachings, such difficulties are overcome through use of relatively simple gridwork which in association with apparatus optically detecting and electronically coordinating the locus of grid linework, insures that record information is unerringly correlated with its exact locus.

It is one of the objects of the present invention, therefore, to provide unique apparatus for the ultra-fast automatic reading of film and the like wherein precision is significantly extended through use of reference grids.

Another object is to provide computer-programmed electronic reading and processing apparatus wherein optical scanning of film or other visual records is automatically correlated with optically-detected reference coordinates to achieve significant improvements in accuracy without requiring comparable precision in mechanical transport mechanisms.

A further object is to provide electro-optical equipment for extending the accuracies of film-reading apparatus of the type which automatically converts visual records of information into digital data and communicates at high speed with digital computer equipment to produce displays, records, and analyses of information.

Still further, it is an object to provide novel and improved film-reading apparatus wherein dichroic reference grid elements which do not interfere with measurements of record data aid in identifying the locus of measured data with a high degree of precision and reliability.

By way of a summary account of practice of this invention in one of its aspects, a frame of film carrying recorded information distinguishable in terms of density is optically scanned incrementally by the light output from successive stepped points illuminated on the screen of a cathode ray tube, as programmed by a computer which impresses the appropriate deflection signals upon the electron beam of the tube. For purposes of accurate discrimination between possible confused conditions when the light is passed through portions of the film which characterize intelligence and through somewhat denser and yet light-permeable portions of the film which do not bear information, the light output from the cathode ray tube source is resolved into separate beams by a beam-splitting mirror, and is then focussed sharply for the programmed point-by-point scanning of the film frame under examination. A photosensitive detector, such as photomultiplier tube, independently intercepts the light which appears in the one of the split beams which does not reach the film, and two other similar detectors intercept light of distinguishably different wavelengths derived from the other of the split beams. The latter different wavelengths results from the interposition of a special dichroic grid in front of the film, where it will intercept the focussed scanning beam, and from further splitting of the light transmitted through the grid and film into separate beams of the different wavelengths before they are directed upon the two other detectors. Electrical outputs from the detectors are compared on an instantaneous basis in logic circuitry which determines whether or not they characterize intelligence at each scanned location on the film and whether or not the grid linework is encountered. The logic circuitry in turn informs associated digital computer equipment of its findings, so that these may be delivered to and stored in digital form on a recording medium such as a magnetic tape. The pattern of electron-beam scan of the cathode ray tube is preferably regulated by the digital computer equipment according to a predetermined simple program which dictates that, once a trace of recorded intelligence on the film is found, the electron beam will be stepped incrementally in a relatively small scanning path on the face of the tube until another detection of intelligence is made, and so on until the recorded information has been fully explored. Coordinates of substantially all points, including those of the grid linework, are established and recorded, and are utilized in determining the precise distances between measurement points and in determining exact record orientations.

Although the aspects of this invention which are believed to be novel are set forth in the appended claims, additional details as to preferred practices and as to the further objects, advantages and features thereof may be most readily comprehended through reference to the following description taken in connection with the accompanying drawings, wherein:

FIGURE 1 provides a partly block-diagrammed and partly schematic illustration of an automatic film reader system incorporating reference grid components;

FIGURES 2*a* and 2*d* are graphical representations of input signals to each of three photomultiplier sensing tubes in the system to FIGURE 1 for the different conditions of scan of a record;

FIGURES 3*a* and 3*b* are plan and cross-sectioned side views, respectively, of grid reference elements which may be used in a system such as that of FIGURE 1;

FIGURES 4*a* and 4*b* are plan and cross-sectioned side views, respectively, of an alternative embodiment of grid reference elements which may be used in a system such as that of FIGURE 1;

Figure 1:
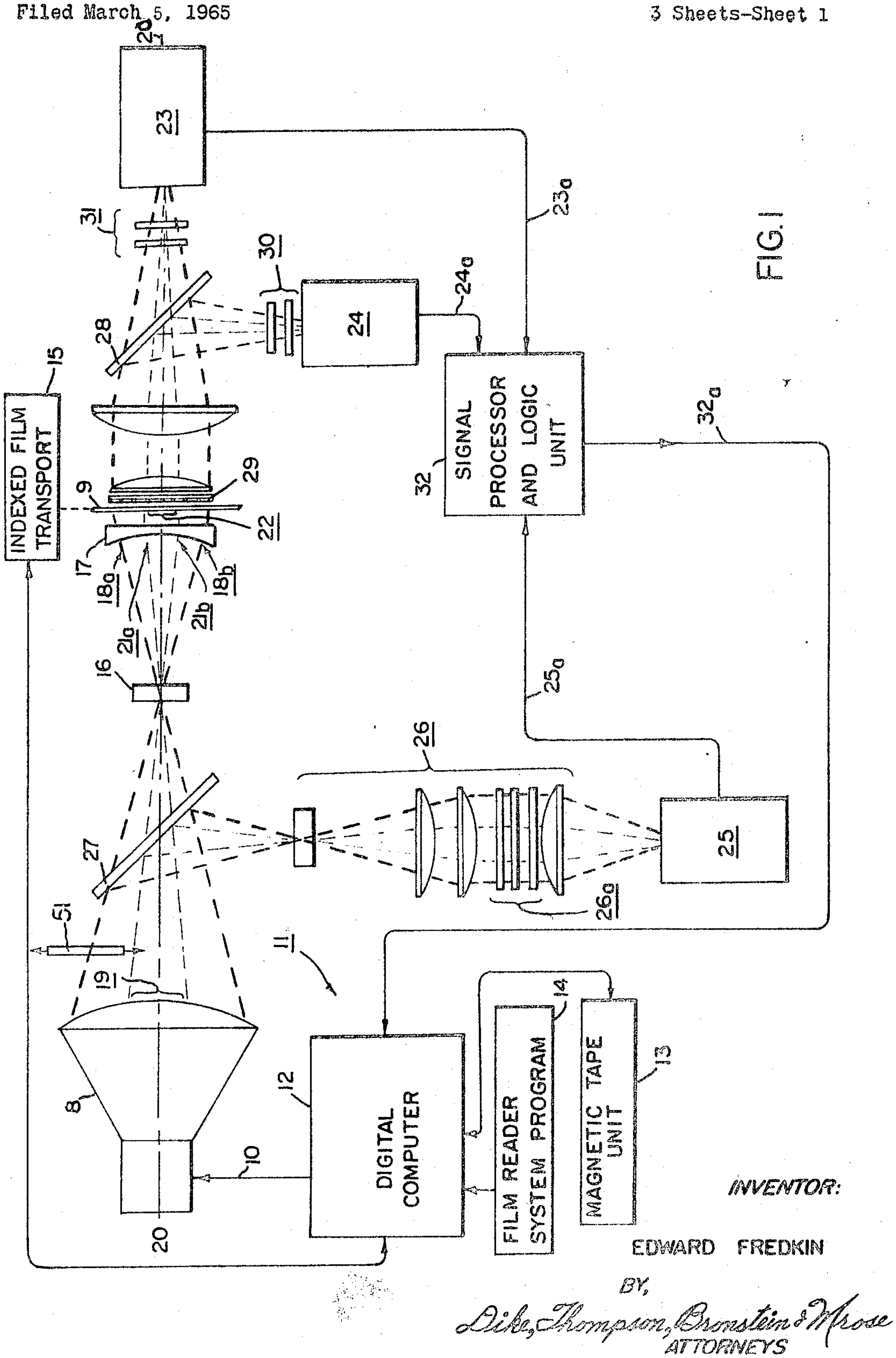

The programmed automatic high-speed film reading system illustrated in FIGURE 1 includes a generally conventional type of cathode ray tube 8 which serves as a source of scanning light which is to impinge upon and scan a record 9, such as a film, in accordance with programmed signals applied to its deflection elements via coupling path 10 from electronic data processing equipment 11, the latter being shown to include a general purpose digital computer 12 and an associated magnetic tape storage unit 13 and a film reader system program unit 14. The record to be examined is mechanically oriented in relation to the optical array for the scanning light rays by a transport mechanism 15, which may conveniently include motor-driven mechanisms for adjusting the record along two mutually perpendicular axes in a plane substantially normal to the projected light rays from tube 8. In the latter connection, the points illuminated on the face of the cathode ray tube are correspondingly illuminated in the plane of the record, preferably on a reduced scale, by the combined effects of lens 16 and a field flattener lens 17. The record transport mechanism receives its automatic actuating signals from the digital computer 12, also. In the arrangement as thus far described, the record may be optically scanned along any or all portions lying within the scanning beam limits, such as 18*a*–18*b*, by the sharply localized beams of light which are emitted from different points on the face of tube 8 as its phosphor screen is scanned by an electron beam. However, in practice, it is found that the spot size on the tube screen tends to be "crystal" sharp and of a uniform size only over a relatively small substantially central screen section 19 near the center or optical axis 20—20, with the remainder of the screen (about 9 x 9 inches overall) developing a relatively distorted or degraded spot; whereas previous techniques have involved adjustments producing a fairly average and, hence poorer, quality of spot illumination over substantially the entire raster area, this is not as desirable for present purposes and, instead, the scanning is confined to the limited expanse 21—21 of the central area near the optical axis of the tube. Concomitantly, the projected sharp-spot optical scannings of the film or other record 8 are necessarily restricted to a section 22 of relatively small size, and cannot be expected to embrace the full area of a film record. Typically, a 3 x 3 inch raster section 19 may be optically reduced to an optical film-scanning raster section 22 which is but 0.2 x 0.2 inch in size and includes 4,096 discrete scanning points. Exceptionally high resolutions are thus made available.

Depending upon whether the film 9 is a positive or negative, and whether or not light rays from the discrete spots of illumination derived from CRT 8 at any instant encounter an item of intelligence recorded on the film, there may be a transmittal of light output through the film to both of the photomultiplier-tube sensors 23 and 24. At the same time, a reference photomultiplier-tube sensor 25 responds to illumination from screen section 19, and detects only whether or not any defocused light reaches it through a lens and filter array 26 as the result of reflections from the obliquely-oriented beam-splitting mirror 27. A further beam-splitting mirror 28 serves to excite both the sensors 23 and 24 with the light transmitted through the film. However, in the improved system, the sensors 23 and 24 are not both sensitive to light of the same wavelengths, nor is the light transmitted to them from the film merely dependent upon the film densities at the scanned points. Instead, a special-purpose grid reference 29, disposed in intimate proximity with the film record 9, serves under certain conditions to filter out the wavelengths of light to which one of the sensors, 24, is sensitive. As is discussed in greater detail later herein, the grid reference 29 is conveniently formed as a dichroic optical unit having a pattern of thin narrow grid lines, of one material which reflects only certain wavelengths of light, superimposed upon a support plate of clear material which transmits substantially all the wavelengths of light involved. Sensor 24, which may be termed a "grid" sensor because of its unique responses to wavelengths of light transmitted through the narrow grid lines, is isolated from other light wavelengths by a filter unit 30. Filter unit 31 isolates sensor 23, which may be termed a "primary"

sensor, from the wavelengths of light reflected by the dichroic grid linework, and thus renders that sensor non-responsive to either the presence or absence of the grid linework in the optical path of scanning at any instant. The responses of reference sensor 25, primary sensor 23, and grid sensor 24 uniquely characterize both the information recorded on the film and the grid reference orientation in relation to the film and, therefore, in relation to the locus of points scanned for information at any time. Signals from these three sensors provide a distinctive coding of the film and grid reference conditions which are encountered, and are applied to a signal processor and logic unit 32 (via couplings 25*a*, 23*a* and 24*a*, respectively) for decoding and translation into related signals which are then delivered to the computer 12 via coupling 32*a*.

The nature of the aforesaid codings is represented in the FIGURE 2*a*–2*d* diagrams of outputs (ordinates) vs. spectral distribution of light (abscissas) of the three (primary, reference, and grid) sensors in the system of FIGURE 1 for the four different operating conditions which may be developed at any instant. Source light from the raster area 19 of CRT 8 is emitted, in this example, over the region of 410–560 millimicrons, and in every case will cause a predetermined output 33 at a high level to be developed by the reference sensor 25 so long as the CRT is operative and its raster exhibits illumination. It is assumed, though not essential, that a filter unit 26*a* in unit 26 limits the reference sensor responses to the range of 460–560 millimicrons. As is characterized in FIGURE 2*a*, when the sharp scanning light spot encounters a clear region of the film, as well as a grid reference line, the primary sensor 23 receives full illumination over its sensitive range of 460–560 millimicrons and delivers a maximum output 34, while the grid reference line reflects in the range of 410–460 millimicrons and thus reduces the output of the grid sensor to substantially zero. If the only changed condition then becomes that of the scanning light's passing through a dense or darkened region of the film, while also passing through a grid reference line, as characterized in FIGURE 2*b*, then the primary sensor output is at a reduced level 34*a* and the grid sensor output remains at about the zero level. When the scanning is through a clear region of film, only, as characterized in FIGURE 2*c*, the grid sensor 24 yields a maximum output, 35, over its sensitivity range of 410–460 millimicrons while the primary and reference sensors produce their maximum outputs 34 and 33 respectively. And, for the fourth remaining possible condition, characterized in FIGURE 2*d*, the scanning light passes only through a dense or darkened region of the film, thereby yielding a lowered grid sensor output 35*a* and a lowered primary sensor output 34*a*, while the reference sensor delivers its usual output 33. Depending upon the film densities, the levels 34*a* and 35*a* may vary, and may be depressed down to substantially zero level when the film is impervious to light; the reference sensor output signifies that fact, and provides a basis for comparison of signal output levels. In a manner which is not here novel per se, the filtering in the primary and reference filter units 31 and 26, respectively, may be adjusted to take into acount the background film densities and, thereby, to permit more distinct resolution of the information recorded on the film. Operation of the signal processor and logic unit (FIGURE 1) in response to the primary and reference signals, and the circuitry for accomplishing such operation may typically be as disclosed in my copending application Ser. No. 357,700, filed Apr. 6, 1964, for "High Speed Film Reading," which has issued as U.S. Patent No. 3,340,359, wherein further detailed disclosures are also provided for the basic system and its components. In one mode of operation, for example, logical comparisons of the outputs from the primary and reference sensors result in application of an electrical "0" bit output signal to the general purpose digital computer when recorded information is present at a scanned point, and application of an electrical "One" bit signal when there is no recorded intelligence at the scanned point. The computer recognizes and identifies each detection of intelligence at each instant in relation to corresponding $x$ and $y$ coordinates of the programmed scanning by CRT 8. Preferably, that scanning is programmed to occur on an incremental basis, rather than on the basis of a full routine scanning of all points on the raster. The resulting higher-speed scanning described in greater detail in my aforesaid copending application, may typically involve a programming, in the computer programming equipment, which calls for a point-by-point scanning along one axis, such as the horizontal or $x$ axis of the tube 8, until a related film position is reached where a trace of recorded information is detected and signalled by the signal processor and logic unit 32. Once this detection is made, and its $x$ and $y$ coordinates are stored by the computer, the scanning is programmed to occur in a predetermined search course about the first-detected point until another point of information is found and stored, and so forth until all the recorded information sought has been discovered and stored in relation to the $x$ and $y$ coordinates at which they were found. Thereafter, the stored information may be retrieved and processed as desired, including play-back on the CRT and recording on or comparison with another film.

Ordinarily, the positional relationships between different points in different areas of the film can only be determined accurately if the film is held absolutely still during measurements and if the programmed scanning does not shift and is extensive enough to embrace all the points of interest. However, as has already been noted hereinabove, the optical scanning must be crystal sharp and uniform and must include a very large number of discrete stepping points, if the film-reading is to be precise. This militates against the use of a very large raster and, in fact, it has now been found that the aforementioned limited raster area near the CRT optical axis and a further substantial reduction in the size of the optical scanning as witnessed by the film, are highly advantageous. Accordingly, film which is relatively large in relation to the optical scanning area developed upon it cannot be read precisely (nor can subsequent recording be made precisely) unless the film can be moved about, as needed, with extraordinary precision. Transport mechanisms which could index a film record about two axes with the required degree of accuracy would be exceedingly difficult and costly to construct and operate. The grid reference 29, on the other hand, enables the needed precision to be realized in a relatively simple and inexpensive manner, and involves the use of only relatively unrefined transport mechanisms in indexing even very large records which are read or recorded upon by a minute optical scanning raster.

As has been described earlier herein, the grid reference 29 is preferably provided with grid linework having dichroic characteristics. In the embodiment depicted in FIGURES 3*a* and 3*b*, a broad-area substrate 36 of optical glass or quartz, having a substantially uniform transmittance over the range of light wavelengths to be transmitted in the system, is thinly coated with a fine narrow-lined grid 37 of dichroic material which sub-divides it, optically, into a plurality of substantially square cells (the grid dimensions being exaggerated for purposes of clarity in the illustration). The dichroic material selected for use may have either selective transmitting or reflecting characteristics, the latter having been chosen for discussion in connection with the FIGURE 1 system. Suitable dichroic materials are well known in the art; in one process for developing the sharp-edged grid linework, the dichroic composition is first vacuum-deposited over one face of the substrate, a grid linework of the desired form is then applied as a mask using conventional vacuum-deposition techniques, a chemical etch then removes the unwanted dichroic material not overlaid by the silver, and, finally, a further chemical etch removes only the silver to leave the desired grid linework 37 in dichroic material alone. Wear of the dichroic material may be suppressed by a coating of silicon dioxide or the like (not shown). The arrangement in FIGURES 3*a* and 4*a*, involving a like substrate 38 and a grid coating 39 of the like dichroic material, is similar except that the narrow "linework" is characterized by absence rather than the presence of the dichroic material; it will be readily understood how the system can take this difference into account in the coding. The illustrated cartesian format of horizontal and vertical lines is preferred, although others may be used also. It is important that at least one edge, such as the lower and lefthand edges 37*a* and 37*b* of the horizontal and vertical linework (FIGURES 3*a* and 3*b*) be sharp and straight, and, if so, the other edges and the line widths may be permitted to be relatively irregular.

Figures 5, 6, 7:
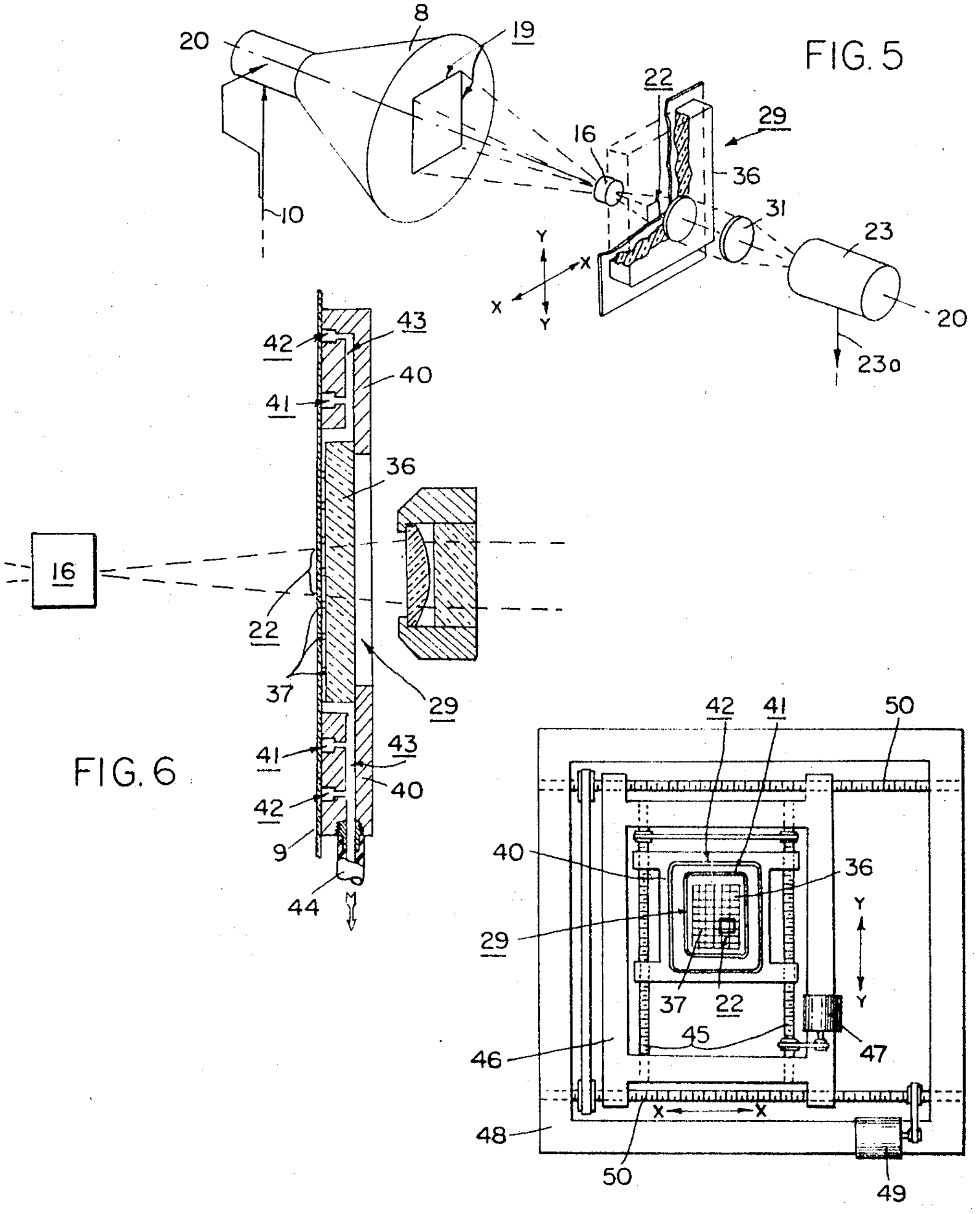
FIGURE 5 illustrates a portion of the optical-mechanical array shown in FIGURE 1, including parts cut away as an aid to clarity.
FIGURE 6 represents, in cross-section, a preferred reference grid and film-holding mechanism, for use in the improved system.
FIGURE 7 provides a pictorial view of mechanized grid- and record-positioning apparatus.

The representations in FIGURES 5–7 include the grid reference unit 29 in a construction such as that of FIGURES 3*a* and 3*b*, and the corresponding elements are therefore assigned the same reference characters. A film record 9 is shown (FIGURES 5 and 6) to be in intimate physical contact with the grid reference 29, the latter being in back, in relation to the direction of oncoming light from the CRT 8, although in an alternative arrangement it could well be disposed in front. In use, the grid reference 29 is held firmly in place so that it cannot move relative to the film record during the programmed scanning, although both the film record and grid reference are moved, together, by an associated transport mechanism which can be commanded to index them in the X and Y directions (FIGURES 5 and 7). This indexing permits the relatively minute (example: 0.2 x 0.2 inch) optical scanning raster 22, as witnessed by the record and grid reference, to be brought into play upon a relatively large expanse of the film record. As is evident from the superimposed optical scaning raster 22 upon the dichroic reference grid 29 in FIGURE 7, the grid linework is proportioned such that a full block or cell space between four coordinate lines may be embraced within the area of raster 22.

A preferred arrangement for maintaining the film and grid reference in intimate non-slip contact appears in FIGURES 6 and 7, wherein a flat mounting plate 40 is provided with concentric recesses 41 and 42 surrounding the central space occupied by the grid reference 29. Grid reference 29 is disposed in coplanar relationship with the face of plate 40 against which the film is abutted. Recesses 41 and 42 are in communication with passageways 43 connected to an evacuating pump (not shown) by a tube 44, and the effect of the recess evacuation is to draw and hold the film securely against the plate and grid reference while the readings or recordings are performed and while the position indexings are taking place. In FIGURE 7, the film record is absent, to expose the grid reference and mounting plate. The transport mechanism there illustrated involves a first pair of vertical feed screws, 45, which are rotatable in the same direction on a framework 46 by a first reversible motor 47 and associated drive belts, to position the mounting plate 40 in the Y directions. Intermediate framework 46, is, in turn, adjustable in the X directions on an outer framework 48 by a second reversible electric motor 49 and associated drive belts which operate a pair of horizontal feed screws 50. This film indexing arrangement, which is included in the indexed film transport 15 of the FIGURE 1 system, responds to command signals from the digital computer 12, and although somewhat unrefined in precision, has sufficient accuracy to index the grid reference within close enough limits for each step to assure the computer that it is witnessing at least one of the same grid lines which it had last taken into account.

For some purposes, it can be advantageous to establish a coding for each of the grid lines, such that their scanning will directly establish which lines have been encountered at any time, and, hence, the exact whereabouts of the grid cell undergoing examination or recording. By way of example, the different lines may have distinctive characterizing widths, or, alternatively, may be comprised of two or more adjacent fine lines having distinctive spacings or characteristically different widths, or may have characteristically different densities or involve characteristically different dichroic materials, and so forth. It will be recognized, also, that the grid reference need not be disposed in abutting relationship with the film, although that is preferred, and, in one alternative construction, may for example comprise an opaque-lined optically-transparent grid held in side-by-side relationship to the film under examination an dseparately scanned optically by a beam split from the beam which simultaneously and synchronously scans the film.

Each detection of the sharp edge of a grid line, by the grid sensor 24, results in an output signal being delivered to the computer 12 over the coupling 32*a*, and the computer thereupon stores the information that the line has been detected when the X and Y deflection coordinates for the electron beam of CRT 8 are of known values. According to one suitable program written into the computer, it instructs the CRT to step its electron beam quickly from left to right, in discrete predetermined increments, until the left sharp edge of a vertical dichroic grid line is detected and signalled by the generation of an output signal by grid sensor 24. All points, or only as many such points as are desired, along this vertical grid line are likewise located, and the information stored by the computer. The next-succeeding vertical grid line may be located similarly. The locus of the lower sharp edge of one or more of the horizontal grid lines bordering a block or cell to be explored is determined by stepping the electron beam vertically and detecting the resulting grid sensor outputs. Thereafter, the X and Y coordinates for each detected point of recorded information on the film within the "cell" limits defined by the grid lines are precisely located with reference to the grid line edges. Depending upon the type of program written into the computer, it may compute such coordinates for each point of information, as the scanning progresses within the raster in the known way, or, it may instead compute such coordinates for a group of points within one block or cell between grid lines. After one cell has been scanned, the computer program commands the film indexing mechanism to move the film and grid in the X and/or Y directions by whatever distance is determined to be of interest. Subsequently, the computer commands a programmed scan for the grid lines and, finding these, stores their location relative to those located earlier. In the latter connection, the accuracy of the indexing transport mechanism is good enough to permit the computer to rely upon the fact that the grid lines it finds are those which are in a predetermined relationship to those discovered earlier. Scanning of the film at the new cell site then yields data which is very precisely correlated, as to position, with the data obtained from evaluation of the preceding cell, and so on throughout the examination of a broad-area film. Phenomenally high precision in determination of relative positions of discovered data is thus achieved without use of commensurately precise transport mechanisms. Large records, such as aerial and astronomical photographs, and X-rays, are readily explored in this manner, and, importantly, the same precision is attained in writing or recording upon a large-area record. For the latter purposes, unwanted exposure of the film during scanning of the grid lines is avoided by interposing a special filter 51 (FIGURE 1) between the CRT and the film; the film used is one which is insensitive to the wavelengths of light transmitted by the filter while the dichroic material is either sensitive to such light (either by absorbing or reflecting it) or merely attenuates it sufficiently to permit detection by comparison of the primary and reference sensor outputs. It should be understood that although light-transmitting film has been discussed, records from which light is reflected may be processed in essentially the same manner, with appropriate modification of the optical technique employed.

The embodiments and practices described and portrayed herein have been presented by way of disclosure, rather than limitation, and those skilled in the art may thus be expected to effect various modifications, substitutions and combinations without departing from the spirit and scope of this invention in its broader aspects.

What I claim as new and desire to secure by Letters Patent of the United States is:

1. Apparatus for the scanning of a visual record such as film or the like, comprising a light source including means for selectably producing illumination independently at each of a plurality of sites on a display screen, a grid reference having optically distinctive grid linework thereon, means for mounting the record and said reference grid in a fixed relationship to one another, means for directing illumination from said source synchronously upon both the record and said grid reference, means for adjusting the positions of said mounting means in relation to the illumination thereof by said illumination directing means, and light-responsive means for producing electrical signals which characterize illuminations of said optically distinctive grid linework, whereby the electrical signals produced by said light-responsive means with said mounting means in different positions characterize the orientations of the record in relation to the illumination at said sites on said display screen.

2. Apparatus for the scanning of a visual record such as film or the like, comprising a relatively large and substantially flat grid reference having a plurality of optically distinctive grid lines which subdivide said reference into relatively small areas, means for mounting the record and grid reference in a fixed relationship to one another, means producing a scanning light beam, means for directing scanning light from said beam synchronously upon both the record and the grid reference within a relatively small scanning area of each, light-responsive means for producing electrical signals which characterize illuminations of said optically distinctive grid lines, and means for adjusting the positions of said mounting means in relation to the light directed upon the record and grid reference thereon from said scanning beam, whereby said electrical signals characterize the orientations of the record in relation to the illumination by said beam.

3. Apparatus for the automatic evaluation of a record containing information discernible under scanning by light, comprising a relatively large and substantially flat grid reference having a plurality of optically distinctive grid lines which subdivide said reference into relatively small areas, means for mounting the record and said grid reference in a fixed relationship to one another, a light source including means for selectably producing illumination independently at each of a plurality of discrete sites on a display screen, means for directing illumination from said source synchronously upon both the record and said grid reference while they are mounted by said mounting means, first light-responsive means for producing first electrical output signals responsive to illuminations thereof by light impinging upon the record, second light-responsive means for producing second electrical output signals which characterize illuminations of said optically distinctive grid lines of said grid reference, and means for adjusting the positions of said mounting means, and hence both the record and said grid reference in synchronism, in relation to the illuminations thereof by said illumination directing means, whereby said second output signals characterize the orientations of the illuminations which produce said first output signals.

4. Apparatus for the automatic evaluation of a record as set forth in claim 3, further comprising third light-responsive means producing third output signals responsive to illuminations from said light source and thereby characterizing the presence and levels of light outputs from said source.

5. Apparatus for the automatic evaluation of a record as set forth in claim 3, wherein said light source includes a cathode ray tube and means for programming the electron beam scanning in said cathode ray tube to produce illumination at each of said sites, whereby said second output signals characterize the orientations relative to said grid lines of information recorded on the record and characterized by said first output signals.

6. Apparatus for the automatic evaluation of a record as set forth in claim 5, wherein said means for programming the electron beam scanning produces illumination at sites on said display screen which are oriented to produce illumination of said grid reference at corresponding sites including sites at which said grid lines are present, and wherein said means for programming the electron beam scanning further produces illumination at sites on said display screen which are oriented to produce illumination of the record at corresponding sites where information recorded on the record may be present.

7. Apparatus for the automatic evaluation of a record as set forth in claim 6, wherein said grid lines form cartesian coordinates subdividing said grid reference into said small areas, wherein said sites of illumination on said display screen lie within a predetermined raster area, and wherein said illumination directing means directs said illumination from said source upon a raster area on the record and said grid reference which is small in relation to the total areas of the record and said grid reference and is larger than said subdivided small areas of said grid reference.

8. Apparatus for the automatic evaluation of a record as set forth in claim 7 wherein the record comprises light-transmitting film, wherein said mounting means mounts the film and said grid reference in a superimposed fixed relationship, and wherein said grid reference includes at least two materials forming said coordinates which are differently sensitive to light of different wavelengths.

9. Apparatus for the automatic evaluation of a record as set forth in claim 8 wherein said second light-responsive means responds to illumination of wavelengths different from the wavelengths of light to which said first light-responsive means, and wherein said illumination of said different wavelengths is received by said first light-responsive means from said grid reference.

10. Apparatus for the automatic evaluation of a film containing information discernible under scanning by light, comprising a light source including means for selectably producing illumination independently at each of a plurality of sites on a display screen, a grid reference including a substantially transparent plate subdivided into a plurality of relatively small predetermined grid areas by a grid pattern of dichroic material which responds to certain wavelengths of light from said source in a manner different from that of the remainder of said plate, means for mounting and holding the film and said grid reference in a fixed superimposed relationship, optical means directing illumination from each of said sites on said screen onto and through both the film and said grid reference held by said mounting means, first light-responsive means producing first electrical output signals characterizing the amount of light transmitted through the film and through said grid reference, second light-responsive means producing second electrical signals characterizing the passage of light both through the film and through the dichroic material of said grid reference, and transport means for mechanically indexing the positions of said mounting means, and hence of both the film and said grid reference in synchronism, in relation to the illumination directed thereon by said optical means, whereby said second electrical signals from said second light-responsive means characterize the orientations of the illuminations which produce said first electrical output signals in relation to said grid pattern of said grid reference without loss of information because of presence of said grid reference.

11. Apparatus for the automatic evaluation of a film as set forth in claim 10 wherein said light source includes a cathode ray tube and means for programming the electron beam scanning in said cathode ray tube to produce illumination at each of said sites only within a limited raster area about the optical axis of said tube wherein the scanning spot size is sharp and of substantially a uniform size and shape, and wherein said optical means directs said illumination onto an area of the film and said grid reference which is small in relation to the areas of the film and grid area and which is larger than said grid areas.

12. Apparatus for the automatic evaluation of a film as set forth in claim 11 wherein said means for programming said electron beam scanning produces illumination at successive sites on said display screen which are oriented to produce illumination of said grid reference at corresponding sites including sites at which said grid pattern is encountered, and further produces illumination at sites on said display screen which are oriented to produce illumination of the film at corresponding sites where information recorded on the film may be present, and further comprising third light-responsive means producing third output signals characterizing the illumination produced on said display screen independently of effects of the film and said grid reference, whereby said electrical signals characterize the information recorded on the film.

13. Apparatus for the automatic evaluation of a film as set forth in claim 10 wherein said means for mounting the film and said grid reference in fixed relationship comprises a holder surrounding said grid reference and having a substantially planar film-holding surface substantially coplanar with a surface of said grid reference, said film-holding surface having recesses therein, and means evacuating said recesses to draw and hold the film in non-slip engagement therewith and with said grid reference.

14. Apparatus for the automatic evaluation of a film as set forth in claim 12 wherein each of said light-responsive means includes a phototube, and wherein said transport means includes motive means for selectably indexing said mounting means in mutually perpendicular directions in substantially one plane substantially normal to the illumination directed upon the film and said grid reference by said optical directing means.

15. Apparatus for the automatic evaluation of a film as set forth in claim 10 wherein said grid reference comprises a substantially flat-surfaced transparent plate and grid linework of said dichroic material superimposed on said plate, said grid linework including crossed lines of said material each having at least one sharp and substantially straight edge, wherein said second light-responsive means comprises a phototube and filter means selectively passing to said phototube wavelengths of light which are substantially the same as the wavelengths of light to which said dichroic material responds, and fur ther comprising a beam-splitting mirror directing light transmitted through the film and said grid reference simultaneously to said first and second light-responsive means along different paths.

16. Apparatus for the automatic evaluation of a film as set forth in claim 15 wherein said dichroic material reflects said wavelengths of light to which said material responds, and wherein said first light-responsive means further comprises filter means selectively filtering out said wavelengths of light to which said material responds.

17. Apparatus for the automatic evaluation of a film as set forth in claim 10 wherein said grid reference comprises a substantially flat-surfaced transparent plate having said dichroic material superimposed thereon in said predetermined grid areas with relatively narrow spaces therebetween to form said grid pattern.

References Cited

UNITED STATES PATENTS

| | | | |
|---|---|---|---|
| 3,062,984 | 11/1962 | Hofker | 315—8.5 |
| 3,083,334 | 4/1963 | Martin | 340—173 |
| 3,322,935 | 5/1967 | Wyke | 235—61.115 |

TERRELL W. FEARS, Primary Examiner

U.S. Cl. X.R.

235—61; 315—3; 328—123